July 20, 1965   F. B. ZACKS   3,195,953
ADJUSTABLE HEADREST
Filed Nov. 4, 1963
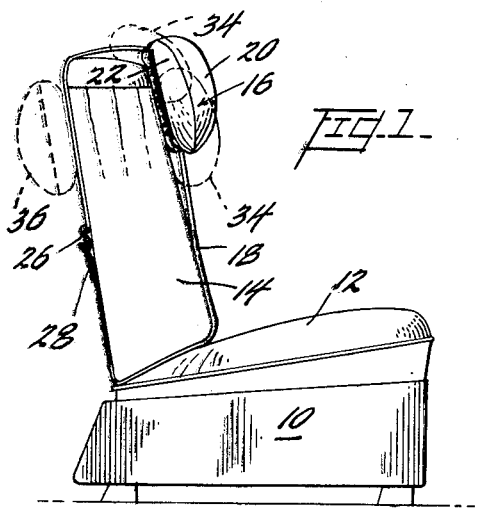
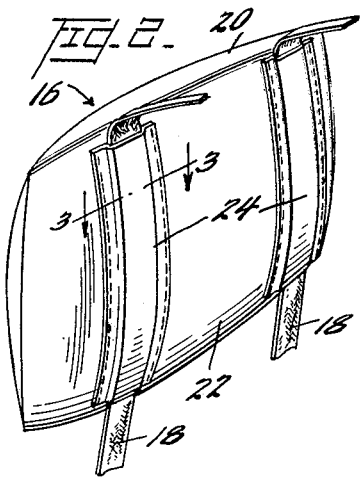
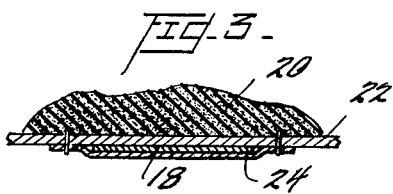
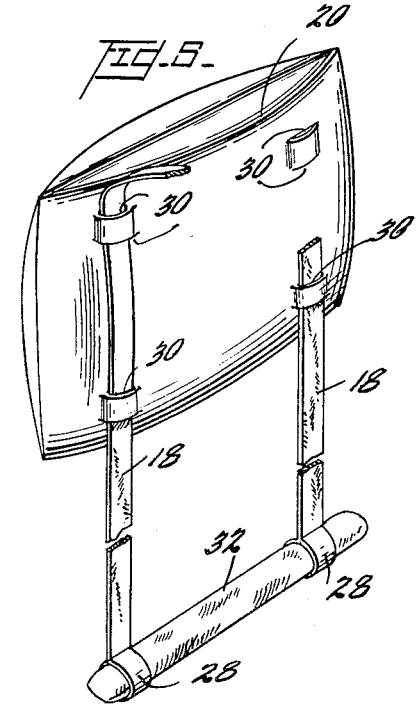
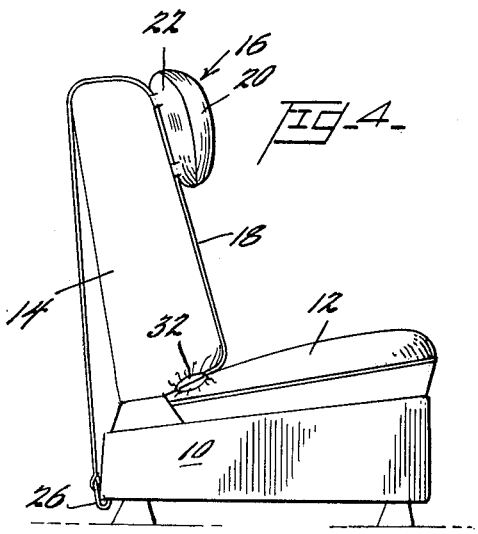
INVENTOR
FLORENCE B. ZACKS
BY Watson, Cole, Grindle & Watson
ATTORNEYS 000
United States Patent Office 3,195,953
Patented July 20, 1965

3,195,953
ADJUSTABLE HEADREST
Florence B. Zacks, Columbus, Ohio, assignor to R. G. Barry Corp., Columbus, Ohio, a corporation of Ohio
Filed Nov. 4, 1963, Ser. No. 321,010
2 Claims. (Cl. 297—397)

This invention relates to an improved headrest, primarily for automobile seat backs, and means for its attachment thereto.

The front seats of present day automobiles have become increasingly shorter due to the lower silhouette of the automobile body and because of this the comfort of passengers has been affected since there is no longer adequate head support. Although the headrest of the present invention is intended primarily for attachment to an automobile seat, it should be understood that it is equally useful in conjunction with other seats in homes, aircraft, trains, and buses.

An object of the present invention is a simply constructed headrest which may be attached to a seat back without the necessity of special tools.

Another object of this invention is to provide a headrest which may be easily attached to any type of seat construction.

Another object of the present invention is to provide a headrest which may be readily affixed to the seat back without damaging the upholstery in any way.

A further object of this invention is a headrest which is easily adjusted to an infinite number of positions to give one maximum comfort.

A still further object of the invention is a headrest which when not in use may be, without demounting it, moved to a position where it will not interfere with one sitting in the seat.

These and other important objects of this invention will become readily apparent from the following description and drawings:

On the drawings:

FIG. 1 is an end view of the headrest showing one embodiment of the means securing it to the seat back.

FIG. 2 is a perspective view of the back side of one embodiment of the headrest.

FIG. 3 is a view taken along the line 3—3 of FIG. 2.

FIG. 4 is an end view of the headrest showing another embodiment of the means securing it to the seat back.

FIG. 5 is a perspective view of the back side of another embodiment of the headrest.

Referring in greater detail to the drawing in which like numerals indicate like parts throughout the several views, reference numeral 10 indicates generally a seat having a seat portion 12 and a back portion 14 extending upwardly from one edge of the seat 12. The seat 12 and the lower end of the back 14 generally compress against each other.

The headrest comprises a cushion 16 having at least one strap 18 slidably attached to it for securing the cushion to the seat back 14. The cushion, shown in detail in FIG. 2, consists of a front surface 20 and a back surface 22 which are sewn together along their peripheries. The cushion may contain any of the commonly known filling materials, such as down and synthetic resin foams, or the cushion may be made of air-impervious materials and filled with air. The back surface 22 of the cushion has sewn to it, or attached in some other manner, one or more parallel strips 24 through which freely pass each of the belts 18. FIG. 3 shows this construction in detail, the strips 24 being sewn along both sides to the back surface 22 of the cushion.

The belts 18 may be conveniently made, at least in part, of an elastic material and are of sufficient length that they will extend completely around any conventional seat back 14 regardless of height. Generally one end of each belt 18 has a rigid hook member 26 attached to it and the opposite end of the belt has a loop 28 such that the ends of each belt may be secured together around the seat back 14. Since the belts are elastic, they will expand to fit any size seat back.

Alternatively, the belts 18 may be slidably secured to the back surface 22 of the cushion by making for each belt at least two vertically parallel horizontal incisions or slots 30 slightly longer than the width of the belt in the back surface of the cushion and threading the belt alternately through the incisions as shown in FIG. 5.

Some seats are constructed such that it is inconvenient if not impractical to pass the belts 18 between the seat 12 and the back 14. In this case, an alternative means is shown in FIGS. 4 and 5 for securing the headrest to the seat back. An elongated member 32, approximately the same length as the width of the headrest 16, is passed through the loops 28 at one end of each of the belts 18 after which the elongated member 32 with the loops 28 is inserted between the seat 12 and the bottom of the back, where it is well secured by the seat and back compressing against it, as shown in FIG. 4. The belts 18 having the headrest 16 attached to them are then passed over the back of the seat and the hooks 26 at the opposite ends of the belts 18 are secured to the bottom back portion of the seat. The belts 18 being at least in part elastic material will be stretched, thus holding the headrest securely in position against the seat back. The elongated member 32 may be made of rigid material, such as wood, preferably of cylindrical shape. Alternatively, it may be made of the same material as the headrest itself and filled with the same resilient filling material.

The headrest is infinitely adjustable as shown in FIG. 1, wherein different positions of the headrest are shown at 34. Either short or tall passengers are able to adjust the headrest upwardly or downwardly to suit their own particular requirements merely by sliding the cushion along the belts 18. If desired, the cushion may be positioned at the top of the seat back and if the passenger wishes not to use the headrest, the cushion may be passed over the top of the seat back and held against the back of the seat back, as shown at 36 in FIG. 1. All such adjustments may be made without detaching the belts 18.

While I have herein described a preferred embodiment of my invention, nevertheless it is to be understood that various changes may be made in the invention, within the scope of the appended claims.

What I claim is:

1. An adjustable headrest for attachment to the seat of a motor car or the like, which seat has a seat-back and a seat-cushion; said headrest comprising a soft, pliable, flexible stuffed fabric cushion adapted to be variously positioned adjacent the upper portions of the forward surfaces of said seat-back, a pair of elastic straps adapted to be disposed in parallel positions vertically across the front and back surfaces of said seat-back, each strap having at one of its ends a hook element and at the other end a loop for use in attaching said headrest to said seat, fabric loops formed on the rearward surface of said cushion and spaced apart laterally, the intermediate elastic portions of said elastic straps passing frictionally through said fabric loops, whereby said cushion may be moved along said straps to suitably adjusted positions and retained therein, the fabric surfaces of the cushion and its loops and the surfaces of the elastic strap, together with the elasticity of the portions of the straps which pass through the loops tending to retain the cushion in any adjusted position.

2. An adjustable headrest for attachment to the seat of a motor car or the like, which seat has a seat-back and a seat-cushion; said headrest comprising a stuffed fabric cushion adapted to be variously positioned adjacent the upper portions of said seat-back, a pair of straps adapted to be disposed in parallel positions vertically across the front and back surfaces of said seat-back, each strap having at one of its ends a hook element and at the other end a loop for use in attaching said headrest to said seat, fabric loops formed on the rearward surface of said cushion and spaced apart laterally, the intermediate portions of said straps passing through said fabric loops whereby said cushion may be moved along said straps to suitably adjusted positions and retained therein, the hooks at the ends of said straps adapted to be hooked around the bottom of the rear portion of said car seat, and a narrow elongated transversely extending stuffed fabric member attached to the looped ends of said straps and adapted to be tucked into the crevice between the car seat-back and seat-cushion to frictionally retain the headrest in place.

References Cited by the Examiner

UNITED STATES PATENTS

| | | | |
|---|---|---|---|
| Re. 24,805 | 3/60 | Morrill | 297—253 |
| 1,559,119 | 10/25 | Miller | 5—322 |
| 1,650,335 | 11/27 | Elzey | 297—253 |
| 2,100,737 | 11/37 | Foster | 297—427 |
| 2,591,306 | 4/52 | Sherman | 297—397 |
| 2,874,757 | 2/59 | Requa | 297—400 |
| 3,046,057 | 7/62 | Smetko | 297—397 |
| 3,129,975 | 4/64 | Emery | 5—327 |

FRANK B. SHERRY, *Primary Examiner.*